United States Patent

Tamura et al.

Patent Number: 5,119,299
Date of Patent: Jun. 2, 1992

[54] SLIP CONTROL FOR AUTOMOTIVE VEHICLE WITH VARIABLE ENGINE SPEED VARIATION CHARACTERISTICS

[75] Inventors: Minoru Tamura; Shinji Katayose; Terukiyo Murakami; Toru Iwata, all of Kanagawa, Japan

[73] Assignee: Nissan Motor Company, Limited, Yokohama, Japan

[21] Appl. No.: 290,337

[22] Filed: Dec. 27, 1988

[30] Foreign Application Priority Data

Dec. 25, 1987 [JP] Japan ................. 62-329147

[51] Int. Cl.$^5$ ............................ B60K 28/16
[52] U.S. Cl. ................. 364/426.02; 180/197
[58] Field of Search .......... 180/197; 364/431.05, 364/426.02, 426.04, 426.03, 431.07; 123/339, 361, 198 DB, 417; 303/100, 97, 99

[56] References Cited

U.S. PATENT DOCUMENTS

| | | | |
|---|---|---|---|
| 4,403,584 | 9/1983 | Suzuki et al. | 123/417 |
| 4,569,560 | 1/1986 | Kubo | 303/116 |
| 4,656,588 | 4/1987 | Kubo | 364/426.02 |
| 4,660,146 | 4/1987 | Kubo | 364/426.02 |
| 4,663,715 | 5/1987 | Kubo | 364/426.02 |
| 4,663,716 | 5/1987 | Kubo | 364/426.02 |
| 4,664,491 | 5/1987 | Kubo | 364/424.02 |
| 4,669,045 | 5/1987 | Kubo | 364/426.02 |
| 4,669,046 | 5/1987 | Kubo | 364/426.02 |
| 4,674,049 | 6/1987 | Kubo | 364/426.02 |
| 4,674,050 | 6/1987 | Kubo | 364/426.02 |
| 4,679,146 | 7/1987 | Kubo | 364/426.02 |
| 4,680,713 | 7/1987 | Kubo | 364/426.02 |
| 4,680,714 | 7/1987 | Kubo | 364/429.02 |
| 4,682,295 | 7/1987 | Kubo | 364/426.02 |
| 4,682,667 | 7/1987 | Hosaka | 180/197 |
| 4,704,684 | 11/1987 | Kubo | 364/426.02 |
| 4,718,013 | 1/1988 | Kubo | 364/426.02 |
| 4,736,814 | 4/1988 | Yogo et al. | 180/197 |
| 4,765,296 | 8/1988 | Ishikawa et al. | 123/399 |
| 4,780,818 | 10/1988 | Kubo | 364/426.02 |
| 4,811,808 | 3/1989 | Matsumoto et al. | 180/197 |
| 4,916,618 | 4/1990 | Stoltman | 180/197 |
| 4,921,064 | 5/1990 | Wazaki et al. | 180/197 |
| 4,962,570 | 10/1990 | Hosaka et al. | 180/197 |

Primary Examiner—Parshotam S. Lall
Assistant Examiner—Michael Zanelli
Attorney, Agent, or Firm—Foley & Lardner

[57] ABSTRACT

A slip control system employs a plurality of slip control characteristics which may be provided as form of maps. One of the maps is selected depending upon wheel slippage in such a manner that a map having a greater engine speed variation rate with respect to variation of an accelerator position is selected while the wheel slippage is maintained smaller than a predetermined target slippage, and a map having a smaller engine speed variation rate is selected while wheel slippage is greater than the predetermined target slippage. The selected map is compared with a map previously selected at a preceding timing which is variable depending upon a lag time of engine response.

22 Claims, 8 Drawing Sheets

SLIP CONTROL FOR AUTOMOTIVE VEHICLE WITH VARIABLE ENGINE SPEED VARIATION CHARACTERISTICS

BACKGROUND OF THE INVENTION

1. Field of the Invention

The present invention relates generally to a slip control system for controlling engine driving torque so as to maintain vehicular wheel slippage at an optimal level for optimizing vehicular driving performance. More specifically, the invention relates to a slip control system which employs a map or table for deriving slip control characteristics in response to a variation of operation magnitude of an accelerator depending upon vehicular driving conditions.

2. Description of the Background Art

In general, it is essential to maintain good road/tire traction for obtaining good vehicular driving performance. For this, wheel slippage has to be maintained within a predetermined optimum range so as to optimize transmission of driving torque from the tread of a vehicular driving wheel to the road surface. Adjustment of driving torque to be delivered to the road wheel is particularly important when the vehicle passes through a road having a surface with substantially low friction, such as wet road, or icy road. In order to maintain wheel slippage at optimum level, Japanese Patent First (unexamined) Publication (Tokkai) Showa 60-43133 proposed a slip control system, in which fuel supply amount for the engine is controlled according to an accelerator position. The disclosed system also includes an arithmetic circuit for comparing rotation speeds of a driving wheel and a driven wheel and for deriving a wheel slippage based on the difference therebetween. When wheel slippage is greater than a predetermined wheel slippage threshold, fuel supply amount is forcingly reduced irrespective of the accelerator position. In such conventional slip control, the fuel supply amount is increased when wheel traction is recovered and thus wheel slippage is decreased to be lower than the wheel slippage threshold, fuel supply amount is resumed to the normal value corresponding to the accelerator position. This tends to cause increased wheel slippage again and thus cause hunting of slip control. Hunting of slip control causes driving torque fluctuations causing jerking on the vehicular body, thereby degrading riding comfort of the vehicle. Furthermore, since the fuel supply amount is controlled irrespective of the accelerator position during slip control mode operation, drive feeling can be degraded because the engine speed is not adjusted linearly corresponding to the accelerator position.

SUMMARY OF THE INVENTION

Therefore, it is a principle object of the present invention to provide a slip control system which can solve the problem set forth above.

Another object of the invention is to provide a slip control system which has a plurality of engine speed control characteristics so as to be selected depending upon the vehicle driving condition and thereby optimize the engine speed variation depending upon the vehicle driving condition for optimizing slip control characteristics.

In order to accomplish the aforementioned and other objects, a slip control system, according to the present invention, employs a plurality of slip control characteristics which may be provided in the form of maps. One of the maps is selected depending upon wheel slippage in such a manner that a map having greater engine speed variation rate with respect to variation of an accelerator position is selected while the wheel slippage is maintained smaller than a predetermined target slippage, and a map having smaller engine speed variation rate is selected while wheel slippage is greater than the predetermined target slippage. The selected map is compared with a map previously selected at a preceding timing which is variable depending upon a lag time of engine response.

According to one aspect of the invention, a slip control system for an automotive vehicle having at least one driving wheel associated with an automotive engine via a power train to be driven by the engine driving torque and at least one driven wheel which is free from the engine driving torque, which automotive engine has an engine speed control mechanism associated with a manually operable accelerator to be driven by the latter to a desired position for obtaining desired engine speed, comprises:

an accelerator servo system for driving the engine speed control mechanism in response to an engine speed control command a wheel slippage monitoring means for monitoring wheel slippage on the driving wheel on the basis of the wheel speeds at the driving wheel and the driven wheel a controller means for deriving the engine speed control command based upon the magnitude of manual operation of the accelerator and according to predetermined engine speed control characteristics, the controller means having a plurality of mutually distinct control characteristics to be used for deriving the engine speed control command, the controller means selecting one of the control characteristics to increase response characteristics for higher response of the engine speed control mechanism relative to the operation magnitude of the accelerator as long as the wheel slippage monitored by the wheel slippage monitoring means is maintained lower than a first wheel slippage criterion, and to lower response characteristics for lower response of the engine speed control mechanism relative to operation magnitude of the accelerator in response to the wheel slippage monitoring means detecting the wheel slippage greater than the first wheel slippage criterion.

According to another aspect of the invention, a slip control system for an automotive vehicle having at least one driving wheel connected to an automotive engine via a power train to be driven by the engine driving torque and at least one driven wheel which is free from the engine driving torque, which automotive engine has a throttle valve associated with a manually operable accelerator to be driven by the latter to a desired position for obtaining a desired throttle valve open angle, comprises:

an accelerator servo system for driving the throttle valve in response to a throttle valve open angle control command a wheel slippage monitoring means for monitoring wheel slippage on the driving wheel on the basis of the wheel speeds at the driving wheel and the driven wheel a controller means for deriving the throttle valve open angle control command based upon the magnitude of manual operation of the accelerator and according to predetermined throttle valve open angle control characteristics, the controller means having a plurality of mutually distinct control characteristics to be used for deriving of the throttle valve open angle control command. the controller means selecting one of the control characteristics to increase response characteristics for higher response of the throttle valve relative to an operation magnitude of the accelerator as long as the wheel slippage monitored by the wheel slippage monitoring means is maintained lower than a first wheel slippage criterion, and to lower response characteristics for lower response of the throttle valve relative to operation magnitude of the accelerator in response to the wheel slippage monitoring means detecting the wheel slippage greater than the first wheel slippage criterion.

Preferably, the controller means is responsive to the wheel slippage monitoring means detecting the wheel slippage greater than the first wheel slippage threshold to select one of control characteristics which has lower response characteristics of the throttle valve open angle control means with reference to the control characteristics actually used at a time given period ahead of a time at which the wheel slippage greater than the first wheel slippage threshold is detected. The controller means may compare values representing the control characteristics actually used at the time given period before the time of occurrence of the wheel slippage greater than the first wheel slip criterion and the current control characteristics for performing lowering of control characteristics with respect to one of the control characteristics actually used at the time given period before the time of occurrence of the wheel slippage greater then the first wheel slip criterion which defines lower response characteristics than the other. In practice, the controller means selects the next lower control characteristics to the selected one of the control characteristics accurately used at the time given before the time of occurrence of the wheel slippage greater than the first wheel slip criterion and the current control characteristics in response to the wheel slippage monitoring means detecting the wheel slippage greater than the first wheel slippage criterion.

Further preferably, the controller means disables lowering of the control characteristics in response to the sensed wheel slippage being greater than the first wheel slippage criterion after it has once lowered control characteristics, and is further responsive to the wheel slippage subsequently increasing to exceed a second wheel slippage criterion which is set at a greater value than the first wheel slippage threshold to lower control characteristics. The controller means is preset at a plurality of control characteristics, each having a maximum throttle valve open angle control command value. The controller means has the highest control characteristics defining the highest response characteristics of the throttle valve and having the greatest maximum throttle valve open angle control command value, and has the lowest response characteristics defining the lowest response characteristics of the throttle valve and having the smallest maximum throttle valve open angle control command value. The controller means is responsive to the wheel slippage monitoring means detecting wheel slippage smaller than a third wheel slippage criterion for selecting higher control characteristics. Furthermore, the controller means selects higher control characteristics when the wheel slippage monitoring means continuously detects the wheel slippage smaller than the third wheel slippage criterion for a given period of time. The controller means cyclically selects higher control characteristics as long as the wheel slippage is maintained smaller than the third wheel slippage criterion.

In a further preferred construction, the third wheel slippage criterion is set at an equal value to the first wheel slippage criterion. The wheel slippage monitoring means detects the manual operation magnitude of the accelerator for deriving the wheel slippage simply depending upon a difference of the wheel speeds of the driving wheel and the driven wheel. The wheel slippage monitoring means detects the manual operation magnitude of the accelerator for deriving the wheel slippage by dividing the difference of the wheel speeds of the driving wheel and the driven wheel by the wheel speed of the driving wheel.

DESCRIPTION OF THE PREFERRED EMBODIMENT

Figure 1:
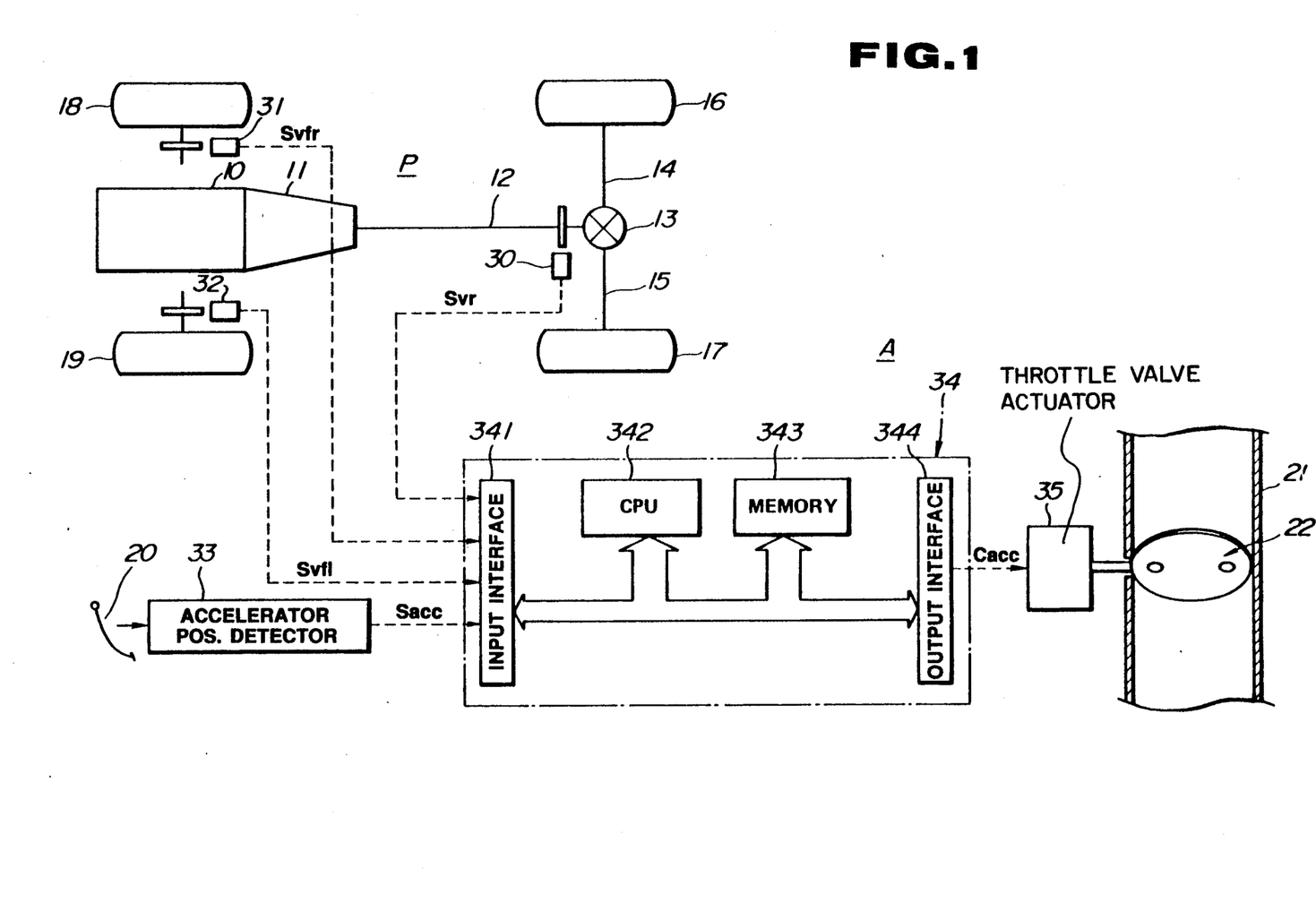
FIG. 1 is a schematic block diagram of the preferred embodiment of a slip control system according to the present invention.

Referring now to the drawings, particularly to FIG. 1, the preferred embodiment of a slip control system, according to the present invention, is applied to an automotive vehicle which has a front engine, rear wheel drive layout. Therefore, the vehicle has an internal combustion engine 10 associated with a power transmission 11 connected to a differential gear unit 13 as a final drive via a propeller shaft 12. The differential gear unit 13 delivers drive shafts 14 and 15 for driving driving wheels 16 and 17. In the shown embodiment, front wheels 18 and 19 are not powered and thus serve as driven wheels. With the shown construction, the engine output torque is input to the power transmission 11 and then transferred to the driving wheels 16 and 17 via the power train including the propeller shaft 12 and the final gear unit 13 to drive the driving wheels at the speed determined by the engine speed and the transmission gear position. On the other hand, since the front wheels 18 and 19 are not powered by the engine driving torque and thus free to rotate, these wheels rotate at a speed corresponding to the vehicle speed.

The engine speed of the engine 10 is adjusted by means of an accelerator 20, such as an accelerator pedal. In the shown embodiment, the accelerator 20 is not mechanically connected to a throttle valve 22 in a throttle chamber 21 of an air induction system of the engine 10. Therefore, the accelerator 20 serves as a commander for inputting an accelerator command signal that is variable depending upon the position of the accelerator and serving as an engine speed command. The accelerator 20 is mechanically associated with an accelerator position detector 33 which comprises a potentiometer in the shown embodiment. The potentiometer 33 monitors accelerator position and generates an accelerator position indicative signal $S_{acc}$. The accelerator position indicative signal $S_{acc}$ is fed to a central unit 34. The control unit 34 outputs a throttle control signal $C_{acc}$ to a throttle valve actuator 35. In the shown embodiment, the throttle valve actuator 35 comprises a stepping motor.

The control unit 34 comprises a microprocessor which includes an input interface 341, CPU 342, a memory unit 343 and an output interface 344. In order to perform wheel slip dependent throttle position control, wheel speed sensors 30, 31 and 32 are connected to the input interface 341 of the control unit 34. The wheel speed sensor 31 is adapted to monitor the rotation speed of the front-right wheel 18 to produce a front-right wheel speed indicative signal $S_{vfr}$. On the other hand, the wheel speed sensor 32 is adapted to monitor the rotation speed of the front-left wheel 19 to produce a front-left wheel speed indicative signal $S_{vfl}$. The wheel speed sensor 30 is associated with a rotary disc fixed on the propeller shaft 12 to monitor the rotation speed of the propeller shaft as an average rotation speed of the rear-right and rear-left wheels 16 and 17 and produces a rear wheel speed indicative signal $S_{vr}$.

The input interface 341 is provided with a frequency-to-voltage (F/V) converter for converting the frequency signal input from the wheel speed sensors 30, 31 and 32 into voltage signals indicative thereof, and an analog-to-digital (A/D) converter for converting the voltage signals output from the F/V converter into digital signals indicative of the voltages.

Though the shown embodiment employs F/V converter and A/D converter for obtaining wheel speed indicative data to be used for deriving the wheel slippage, it may be possible to directly count the pulse signals input from the wheel speed sensors 30, 31 and 32 within a given period. Manners of derivation of the wheel speed employing the digital process have been disclosed in the following U.S. Pat. Nos.:

U.S. Pat. No. 4,674,049
U.S. Pat. No. 4,704,684
U.S. Pat. No. 4,663,715
U.S. Pat. No. 4,663,716
U.S. Pat. No. 4,660,146
U.S. Pat. No. 4,665,491
U.S. Pat. No. 4,780,818
U.S. Pat. No. 4,674,050
U.S. Pat. No. 4,680,714
U.S. Pat. No. 4,682,295
U.S. Pat. No. 4,680,713
U.S. Pat. No. 4,669,046
U.S. Pat. No. 4,669,045
U.S. Pat. No. 4,679,146
U.S. Pat. No. 4,656,588
U.S. Pat. No. 4,718,013
U.S. Pat. No. 4,569,560

The disclosure of the aforementioned U.S. Pat. Nos. are herein incorporated by reference for the sake of disclosure.

The A/D converter in the input interface may also serve for converting the analog form accelerator position indicative signal input from the potentiometer 33 in order to derive an accelerator position data. The accelerator position data derived on the basis of the accelerator position indicative signal serves as an absolute accelerator position indicative data $D_{acc}$. The control unit 34 processes the absolute acceleration position indicative data $D_{acc}$ and wheel speed indicative data $D_{vfr}$, $D_{vfl}$ and $D_{vr}$ for deriving the throttle control signal $C_{acc}$.

The memory unit 343 of the control unit 343 stores maps, each of which defines a throttle valve angular position $\theta$ in relation to the absolute accelerator position indicative data $D_{acc}$. In the shown embodiment, the memory unit 343 contains eight maps, i.e. map No. 0 to No. 7. These maps are selected on the basis of the road surface friction coefficient $\mu$. Relationships between the maps and the corresponding road surface friction coefficient $\mu$ will be seen from the following table 1.

TABLE 1

| | Map No. | | | | | | |
|---|---|---|---|---|---|---|---|
| No. 0 | No. 1 | No. 2 | No. 3 | No. 4 | No. 5 | No. 6 | No. 7 |
| $\mu$ — | 09 | 08 | 05 | 04 | 03 | 02 | 01 |

Figure 2:
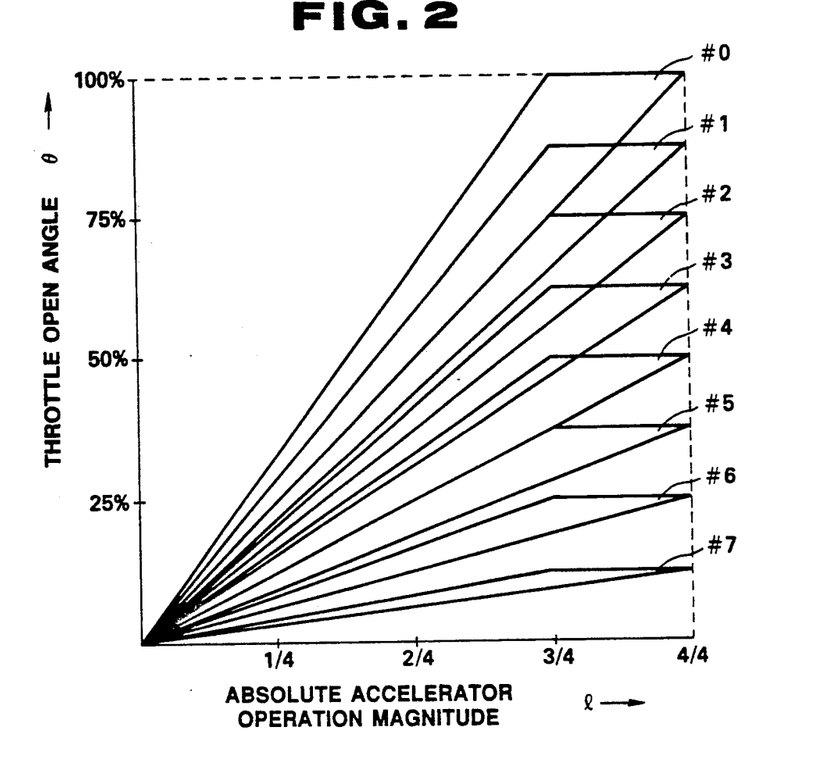
FIG. 2 is a chart showing various characteristics of throttle valve angular position in relation to an accelerator position.

The maps No. 0 to No. 7 are shown in FIG. 2. In FIG. 2, the maximum allowable throttle valve open angle $\theta$ is derived at a throttle valve open ratio (%) versus 100% at fully open position at the fully operated position or fully depressed position of the accelerator 20. The maximum allowable throttle valve angle variation rate (gradient of the lines of FIG. 2) of each map is determined by connecting the throttle valve open ratio at ¾ accelerator position to the 0 point. On the other hand, the minimum throttle angle variation rate of each map is determined by connecting the 0 point to the maximum throttle valve open ratio at 4/4 accelerator position. As seen from FIG. 2, the region of respectively adjacent maps are overlapping to each other.

On the other hand, the memory unit 343 further contains a throttle open angle variation rate $\Delta\theta$ versus a relative accelerator position variation $\Delta acc$. As seen from FIG. 3, the throttle open angle variation rate $\Delta\theta$ varies in relation to the variation of the relative accelerator position variation $\Delta acc$ in non-linear fashion.

As set forth, the throttle valve actuator 35 comprises a stepping motor for rotatingly driving the throttle valve in a stepwise fashion. Therefore, the throttle control signal $C_{acc}$ output through the output interface 344 is a pulse train representating the direction of the throttle angle variation by the polarity of the pulse and the magnitude of throttle angle variation by the number of the pulses. The output interface 344 feeds back the throttle angle control signal to CPU 342. CPU 342 operates the memory unit 343 to count up or down the pulses as the throttle control signal to monitor the actual throttle angle position $\theta_0$.

The practical operation to be implemented by the slip control system of FIG. 1 will be described herebelow with reference to FIGS. 4(a) to 4(d) and 5.

FIGS. 4(a) to 4(d) show a sequence of a slip control program stored in the memory unit 343 and to be executed by CPU 342. The shown program is designed to be executed at every fixed timing with a regular interval, e.g. every 20 msec. In order to trigger the shown program, the control unit 34 has an internal clock and an internal timer for measuring an elapsed time to trigger the program at every given period or is connected to an external timing system to bs triggered by a trigger command issued at a given timing.

Figure 4A:
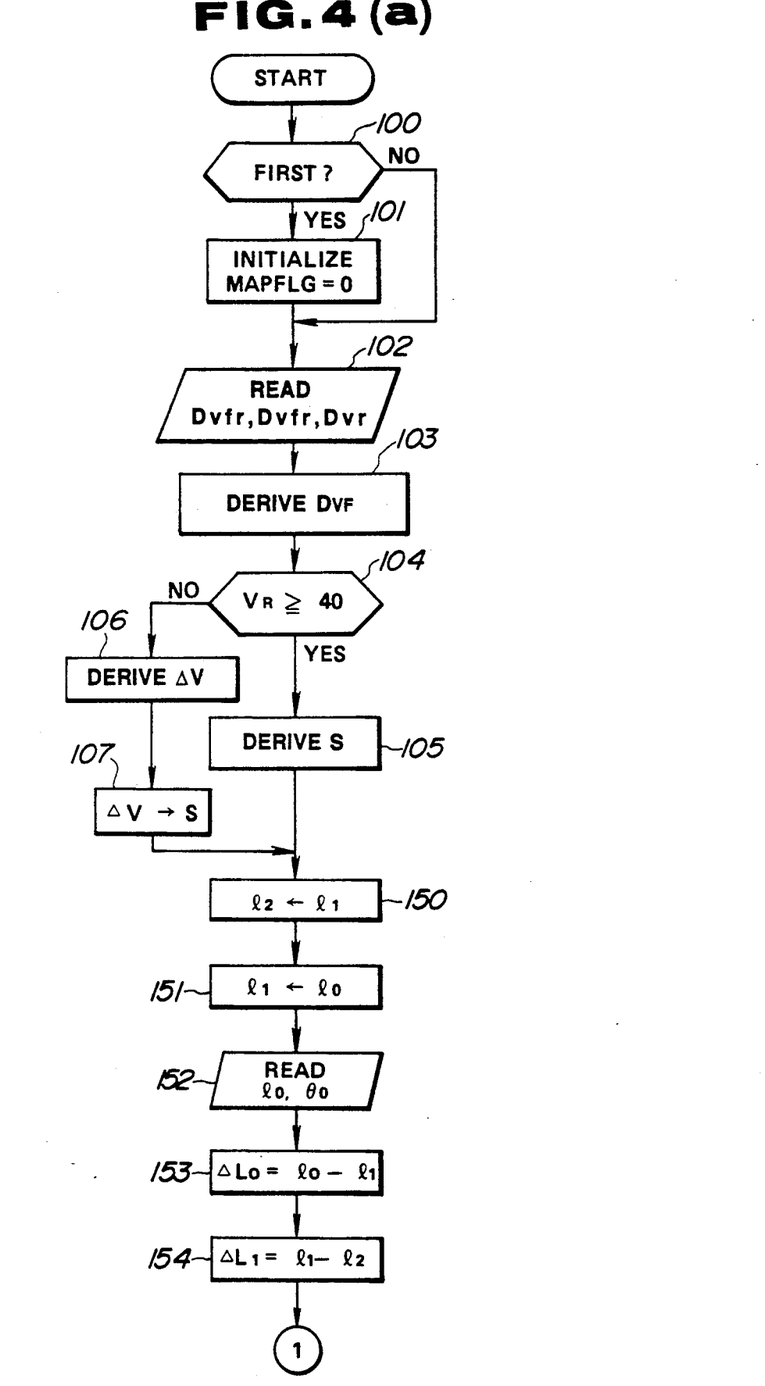
FIGS. 4(a), 4(b), 4(c) and 4(d) are sequences of a flowchart showing a slip control program to be executed in the slip control system of FIG. 1.

Immediately after starting execution, the routine is checked to determine whether the current execution cycle is the first cycle executed immediately after starting of power supply, at a step 100. If the current cycle as checked at the step 100 is the first cycle, initialization is performed for resetting data, such as the accelerator position reference $acc_{00}$, the throttle position reference $\theta_{00}$ and so forth, flags, such as selected map indicative flag MAPFLG, at a step 101. Through the initializing step 101, all of the data accumulated through the previous drive of the vehicle is cleared and set at an initial value. When the current execution cycle is not the first execution cycle as checked at the step 100, the process jumps to step 101.

After initializing at the step 101 or when the current execution cycle is not the first cycle as checked at the step 100, wheel speed indicative datas $D_{vfr}$, $D_{vfl}$ and $D_{vr}$ which are derived on the basis of front-right, front-left and rear wheel speed indicative signals $S_{vfr}$, $S_{vfl}$ and $S_{vr}$ are read out at step 102. On the basis of the front-right and front-left wheel speed indicative data $D_{vfr}$ and $D_{vfl}$, an average front wheel speed data $D_{VF}$ which serves as driven wheel speed data representative of vehicle speed, is calculated at a step 103. As indicated in the block labeled 103, the average front wheel speed data $D_{VF}$ is derived by dividing the sum of the frontright right and front-left wheel speed indicative data $D_{vfr}$ and $D_{vfl}$ by two.

After deriving the average front wheel speed indicative data $D_{VF}$ as the driven wheel speed indicative data, a check for the rear wheel speed indicative data $D_{VR}$ is performed to determine whether the data value is greater than a given value which corresponds to a predetermined vehicular speed, at step 104. In the shown embodiment, the given value represents the vehicular speed of 40 km/h. When the rear wheel speed indicative data $D_{VR}$ is greater than the given value as checked at the step 104, a wheel slip ratio or wheel slippage S is calculated at step 105. In practice, the wheel slippage S is derived by the following equation:

$$S = (D_{VR} - D_{VF})/D_{VR}$$

Figure 7A:
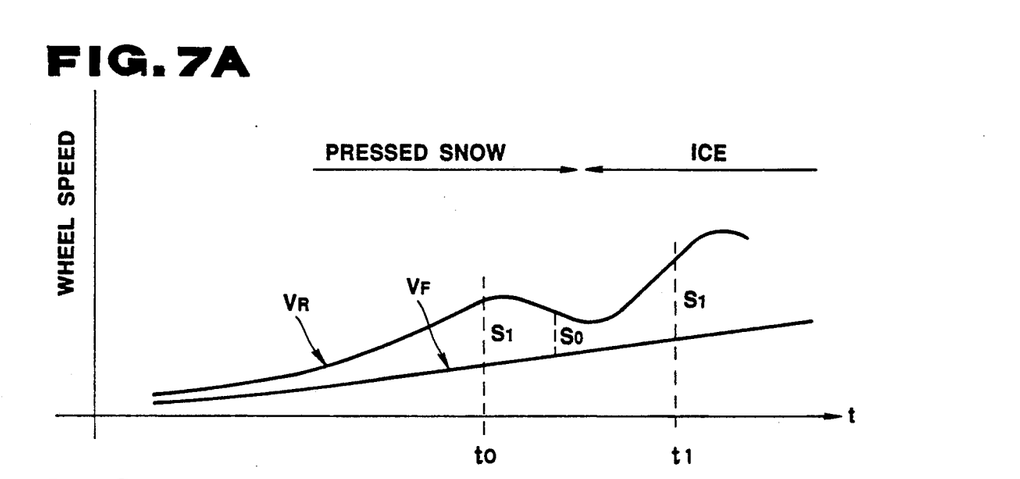
FIGS. 7A and 7B are timing charts showing practical operation of the slip control implemented by the preferred embodiment of the slip control system of FIG. 1.
Figure 7B:
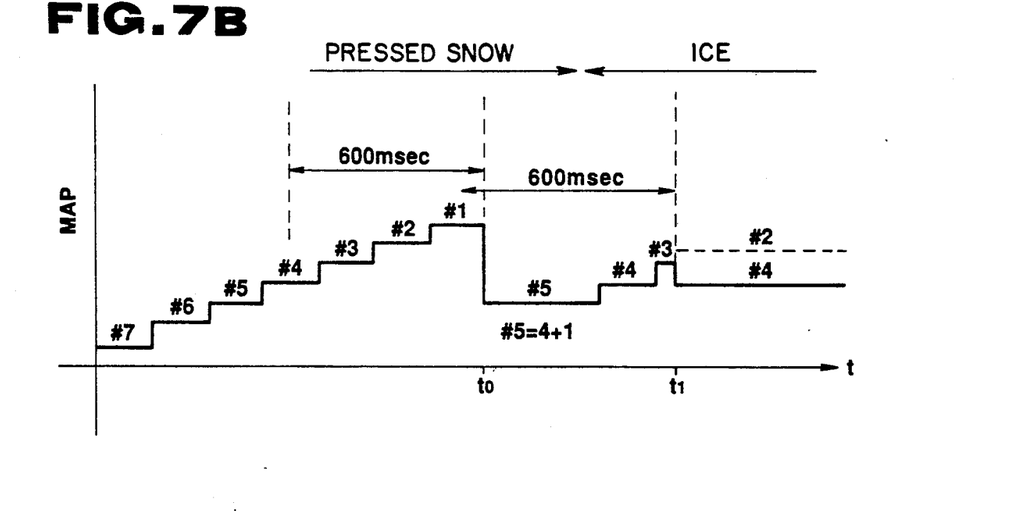

On the other hand, when the rear wheel speed indicative data $D_{VR}$ is smaller than or equal to the given value as checked at the step 104, a wheel speed difference data $\Delta V$ is calculated by subtracting the front wheel speed indicative data $D_{VF}$ from the rear wheel speed indicative data $D_{VR}$ at a step 106. Based on the wheel speed difference data $\Delta V$, the wheel slippage S is derived at a step 107. In the process of step 107, the wheel slippage S derived on the basis of the wheel difference date $\Delta V$ is determined simply depending upon the wheel speed difference as seen from FIG. 7. In the example of FIG. 7B, the wheel slippage S varies among 0.1, 0.2 and 0.3. When the rear wheel speed indicative data $D_{VR}$ is greater than the given value, the wheel slippage S to be derived at the step 105 varies depending upon the wheel speed difference $\Delta V$ and the rear wheel speed indicative data, and when the rear wheel speed indicative data $D_{VR}$ is smaller than the given value, the wheel slippage S derived at the step 107 becomes respectively 0.1, 0.2 and 0.3 when the wheel speed difference data $\Delta V$ varies between 4 km/h, 8 km/h and 12 km/h. The wheel slippage S derived at one of the steps 105 and 107 will serve as a wheel slippage threshold for the following process.

After the process at one of the steps 105 and 107, the process goes to a step 150, in which an accelerator operation magnitude indicative data $l_1$ which is sampled in the second preceding execution cycle and treated as an absolute accelerator operation magnitude in the immediately preceding execution cycle is read out and registered in an appropriate memory of the microprocessor as the second preceding cycle accelerator operation magnitude indicative data $l_2$. On the other hand, the accelerator operation magnitude indicative data $l_0$ which is sampled in the immediately preceding execution cycle and treated as instantaneous accelerator operation magnitude indicative data is transferred as the absolute accelerator operation magnitude indicative data $l_1$ at a step 151. Thereafter, an instantaneous accelerator operation magnitude data $l_0$ is sampled at a step 152. At the same time, at the step 152, an instantaneous throttle valve angular position data $\theta_0$ is also sampled. Then, an accelerator operation magnitude difference $\Delta L_0$ is derived by subtracting the absolute accelerator operation magnitude indicative data $l_1$ rom the instantaneous accelerator operation magnitude indicative data $l_0$, at a step 153. The accelerator operation magnitude difference $\Delta L_0$ represents the accelerator position variation magnitude within an interval between the current execution cycle and the immediately preceding execution cycle. This accelerator operation magnitude difference $\Delta L_0$ will be hereafter referred to as current accelerator position variation indicative data. At a step 154, an accelerator operation magnitude difference $\Delta L_1$ is derived by subtracting the two preceding cycle accelerator operation magnitude indicative data $l_2$ from the absolute accelerator operation magnitude indicative date $l_1$. The accelerator operation magnitude difference $\Delta L_1$ represents the accelerator position variation magnitude within an interval between the two preceding cycle and the immediately preceding cycle. This accelerator operation magnitude difference $\Delta L_1$ will be hereafter referred to as preceding accelerator position variation data.

After the process at the step 154, the process goes to steps 251 to 255, in which slip control characteristics indicative flags MAPFLG are stored over the most recent execution cycles. In the shown embodiment, the slip control characteristics indicative flag MAPFLG is stored for 600 msec. Since the shown program is designed to be executed at every 20 msec., thirty flags are stored. For storing new flag MAPFLG, all precedingly set twenty-nine flag data are shifted to the next address. Therefore, at a step 291, a flag shift counter value CRT is checked to determine whether it reaches 30. If the flag shift counter value CRT is smaller than 30, the address of the memory address to store than flag data to be shifted is incremented by 1 and the oldest flag data in the greatest memory address is cleared, at a step 252. Thereafter the flag shift counter CRT is incremented by one (1) at a step 253. The steps 251, 252 and 253 form a loop to be repeatedly executed until the counter value CRT reaches 30. On the other hand, when the counter value CRT reaches 30 as checked at the step 251, the process goes to a step 254, in which the oldest flag data MAPFLG is set as a preceding map data MAPOLD. Namely, through the process of the steps 251 to 254, the preceding map data MAPOLD is set by the flag data of 600 msec. ahead. After the process at the step 254, the lag shift counter value CRT is cleared at a step 255.

Figure 4B:
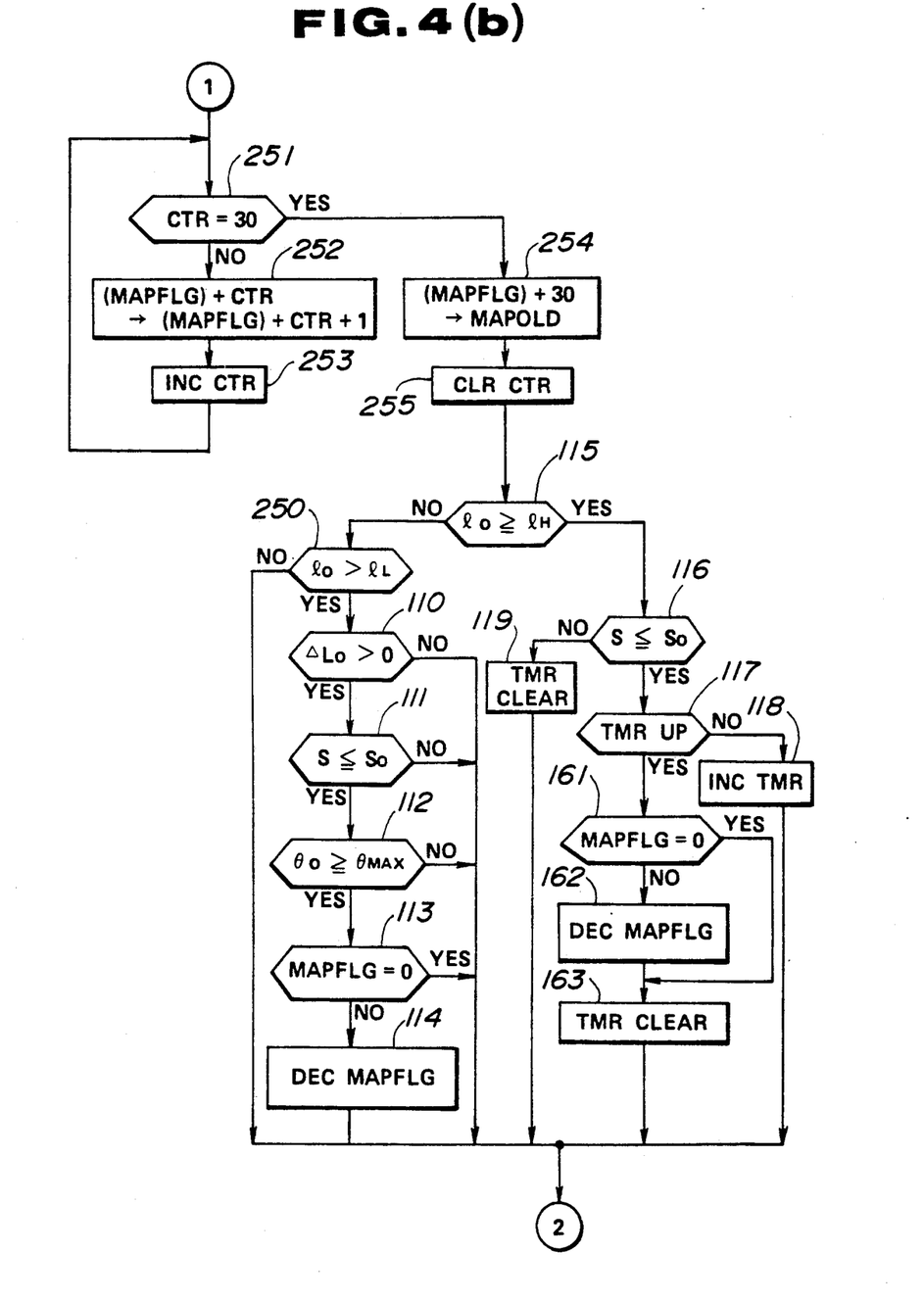

After the step 255, the process goes to a step 115, in which the instantaneous accelerator operation magnitude indicative data $l_0$ is compared with a predetermined upper accelerator operation magnitude threshold value $l_H$. This step 115 is performed for detecting the current accelerator operating magnitude as represented by the instantaneous accelerator operation magnitude indicative data $l_0$, indicative of high load condition. In the preferred embodiment, the upper accelerator operation magnitude threshold value $l_H$ is set at a value corresponding to the engine driving range which may cause kick-down in the automatic power transmission. Practically, the upper accelerator operation magnitude threshold value $l_H$ is set at $\frac{3}{4}$ of the fully operated or depressed condition. If the instantaneous accelerator operation indicative data $l_0$ is smaller than the upper accelerator operation magnitude threshold value $l_H$, the instantaneous accelerator operation indicative data is compared with a lower accelerator operation magnitude threshold value $l_L$, at a step 250. The lower accelerator operation magnitude threshold value $l_L$ is set at a value representative of low engine acceleration demand condition and practically set at a value to $\frac{1}{4}$ of the full accelerator operation magnitude.

If the instantaneous accelerator operation magnitude indicative value $l_0$ is greater than the lower accelerator operation magnitude threshold value $l_L$ as checked at the step 250, which implies that the accelerator operation magnitude indicative value $l_0$ is smaller than or equal to the upper accelerator operation magnitude threshold valve $l_H$ and greater than the lower accelerator operation magnitude indicative value $l_L$, the current accelerator position variation indicative data $\Delta L_0$ is checked whether it is greater than zero (0) at a step 110. If the currant accelerator position variation indicative value $l_L$ as checked at the step 110 is greater than zero, the wheel slippage S is compared with a predetermined low wheel slippage threshold $S_0$ at a step 111. The low wheel slippage threshold $S_0$ is set at a value (e.g. $S=0.1$) representative of a criterion of substantially small wheel slippage which does not require slip control even when the throttle valve open angle varies substantially at a normal rate. If the wheel slippage S is smaller than or equal to the low wheel slippage threshold $S_0$ as checked at the step 111, the throttle valve angular position indicative data $\theta_0$ is compared with a predetermined maximum throttle open position data $\theta_{max}$ which represents the maximum throttle valve angular position in a throttle valve angle variation range in the selected control characteristics, at a step 112. When the instantaneous throttle valve angular position indicative data $\theta_0$ is greater than or equal to the maximum throttle open position data $\theta_{max}$, the slip control characteristics indicative flag value MAPFLG is compared with zero (0) at a step 113. The slip control characteristics indicative flag value MAPFLG being equal to zero represents normal throttle valve response characteristics in response to the accelerator operational magnitude. If the slip control characteristics indicative flag value MAPFLG is not zero, i.e. greater than zero, as checked at the step 113, the value of the slip control characteristics indicative flag MAPFLG is decreased or decremented by one (1), at a step 114.

On the other hand, when the instantaneous accelerator operation magnitude indicative data $l_0$ is smaller than or equal to the low accelerator operation magnitude threshold $l_L$ as checked at the step 250, when the current accelerator position variation data $\Delta L_0$ is smaller than or equal to zero as checked at the step 110, when the wheel slippage S is greater then the low wheel slippage threshold $S_0$ as checked at the step 111, when the instantaneous throttle valve angular position indicative data $\theta_0$ is smaller then the maximum throttle open position value $\theta_{max}$ as checked at the step 112, or when the slip control characteristics indicative flag value MAPFLG is zero as checked at the step 113, the process jumps the step 114.

On the other hand, when the instantaneous accelerator operation magnitude indicative data $l_0$ is greater than or equal to the upper accelerator operation magnitude threshold $l_H$ as checked at the step 115, the wheel slippage S is compared with the low wheel slippage threshold $S_0$ at a step 116. If the wheel slippage S is smaller than or equal to the low wheel slippage threshold $S_0$ as checked at the step 116, a timer value TMR is checked whether it is greeter than or equal to a predetermined time-up threshold, at a step 117. In practice, the time-up threshold is set at a value corresponding to 0.8 sec. When the time, value TMR is smaller than the time-up threshold as checked at the step 117, the timer value TMR is incremented by one (1) at a step 118. On the other hand, when the wheel slippage S is smaller than the low wheel slippage threshold $S_0$ as checked at the step 116, the timer value TMR is cleared at a step 119.

When the wheel slippage S is greater than or equal to the low wheel slippage threshold $S_0$ as checked at the step 116, and when the timer value TMR is greater than or equal to the time-up threshold as checked at the step 117, the slip control characteristics indicative flag value MAPFLG is checked at a step 161. If the slip control characteristics indicative flag value MAPFLG is greater than zero (0) as checked at the step 161, the value of the slip control characteristics indicative flag MAPFLG is decreased by one (1) at a step 162. On the other hand, when the slip control characteristics indicative flag value MAPFLG is zero as checked at the step 161, the process jumps to the step 162 and clears the timer value TMR at a step 163. On the other hand, after decreasing the value of the slip control characteristics indicative flag MAPFLG at the step 162, the process goes to the step 163.

Figure 4C:
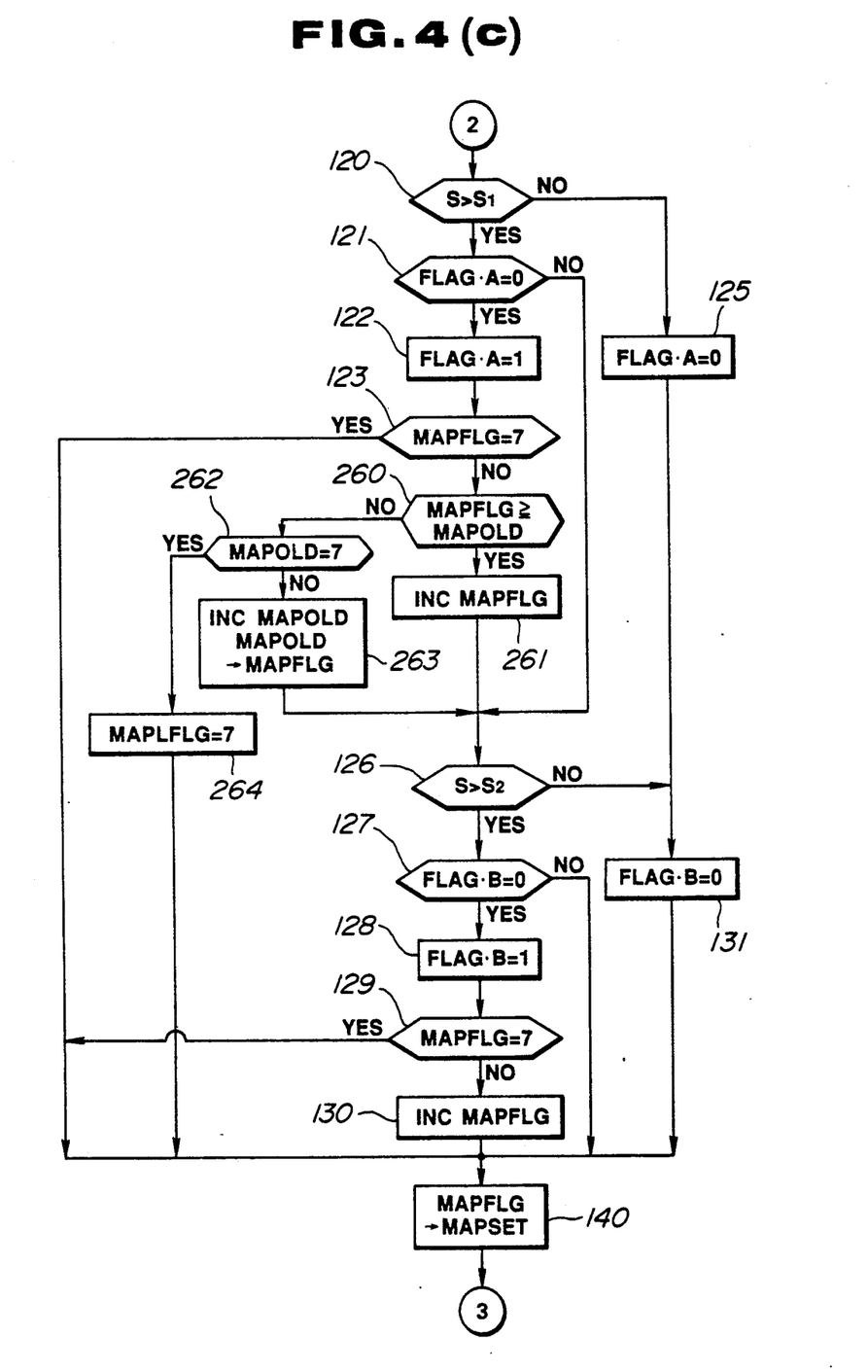

At a step 120 which is triggered after one of the steps 250, 114, 119, 163 and 118, the wheel slippage S is compared with a first map down threshold $S_1$ at a step 120. The first map down threshold $S_1$ is set at 0.1 in the shown embodiment. Though the shown embodiment takes the first map down threshold $S_1$ at the equal value to the low wheel slippage threshold $S_0$, it can be set at a value different from that of the low wheel slippage threshold $S_0$. If the wheel slippage S as checked at the step 120 is greater than the first map down threshold $S_1$, a first map down disabling flag FLAGA is checked at a step 121. When the first map down disabling flag FLAGA is not set aa checked at the step 121, the first map down disabling flag FLAGA is set at a step 122. Thereafter, the slip control characteristics indicative flag value MAPFLG is checked whether the value is a maximum value, e.g. seven (7). at a step 123. The maximum value of the slip control characteristics indicative flag value MAPFLG represents the lowest throttle valve angle response characteristics versus variation of the accelerator operation magnitude. When the slip control characteristics indicative flag value MAPFLG is equal to the maximum value, the slip control characteristics indicative flag value is compared with the preceding slip control characteristics indicative flag value MAPOLD, at a step 260. If the slip control characteristics indicative flag value MAPFLG is equal to the maximum value e.g., seven (7), as checked at the step 260, the slip control characteristics indicative flag value MAPFLG is incremented by one (1) at a step 261.

On the other hand, when the slip control characteristics indicative flag value MAPFLG, as checked at the step 260, is smaller than the preceding slip control characteristics indicative flag value MAPOLD, the preceding slip control characteristics indicative flag value is compared with the maximum slip control characteristics indicative flag value at a step 262. When the preceding slip control characteristics indicative flag MAPOLD is smaller than the maximum slip control characteristics flag value, e.g. seven, the preceding slip control characteristics indicative flag MAPOLD is incremented by one (1) at a step 263. At the step 263, the slip control characteristics indicative flag value MAPFLG is set at the value of the preceding slip control characteristics indicative flag value MAPOLD. On the other hand, when the preceding slip control characteristics indicative flag value MAPOLD, as checked at the step 262, is equal to the maximum slip control characteristics indicative flag value, the slip control characteristics indicative flag value MAPFLG is set at the maximum value, e.g. seven (7), at a step 264.

When the wheel slippage S is smaller than or equal to the first map down threshold $S_1$ as checked at the step 120, the process goes to a step 125, in which the first map down disabling flag FLAGA is reset.

At a step 126, the wheel slippage S is compared with a second map down threshold $S_2$. In the shown embodiment, the second map down threshold $S_2$ is set at a value greater than the first map down threshold $S_1$ and practically set at a value 0.3. When the wheel slippage S as checked at the step 126 is greater than the second map down threshold $S_2$, a second map down disabling flag FLAGB is checked at a step 127. If the second map down disabling flag FLAGB is not set as checked at the step 127, the second map disabling flag FLAGB is set at a step 128. Thereafter, the slip control characteristics indicative flag value MAPFLG is checked at a step 129. A check at the step 129 is performed by comparing the slip control characteristics indicative flag value MAPFLG with the maximum slip control characteristics indicative flag value, e.g. seven (7). When the slip control characteristics indicative flag value MAPFLG is smaller than the maximum value, the flag value is incremented by one (1) at a step 130. Thereafter, the process goes to a step 140, in which a slip control characteristics indicative data MAPSET is set at a value corresponding to the slip control characteristics indicative flag value MAPFLG. At the step 140, setting of the slip control characteristics indicative data MAPFLG is performed by selecting one of eight maps respective of which shows the variation characteristics of throttle valve angular position relative to the variation of the accelerator position. The selection of one of the maps is done by the slip control characteristics indicative flag value MAPFLG. When the wheel slippage S is smaller than or equal to the second map down threshold $S_2$, the second map down disabling flag FLAGB is reset at a step 131.

On the other hand, when the slip control characteristics indicative flag value MAPFLG, as checked at the step 123, is the maximum value, e.g. seven (7), after setting the slip control characteristics indicative flag value to seven at the step 264, or after resetting the second map down disabling flag FLAGB at the step 131, the process goes to the step 140.

After setting the slip control characteristics indicative data MAPSET at a step 140, the instantaneous accelerator operation magnitude indicative data $l_0$ is compared with the low accelerator operation magnitude threshold $l_L$, at a step 164. When the accelerator operation magnitude indicative data $l_0$ is greeter than the low accelerator operation magnitude threshold is $l_L$ is checked at the step 164, the current accelerator position difference indicative data $\Delta L_0$ is compared with zero (0) at a step 155. If the current accelerator position difference indicative data $\Delta L_0$, as checked at the step 155, is greater than zero, the preceding accelerator position difference indicative data $\Delta L_1$ is compared with zero (0) at a step 156. On the other hand, when the current accelerator position difference indicative data $\Delta L_0$ is smaller than or equal to zero (0) is checked at the step 155, the preceding accelerator position difference indicative data $\Delta L_0$ is compared with zero (0) at a step 157.

Through the steps 155, 156 and 157, the direction of accelerator operation is checked. When the accelerator is operated for acceleration over the preceding and current execution cycles, both of the accelerator position difference indicative data $\Delta L_0$ and $\Delta L_1$ are held at a positive value greater than zero (0). Therefore, in such case, the answers at the steps 155 and 156 become YES. On the other hand, when the accelerator is operated in decelerating direction over the preceding and current cycles, both of the accelerator position difference indicative data $\Delta L_0$ and $\Delta L_1$ are held at negative value smaller than zero (0). Therefore, in such case, the answers at the steps 155 and 157 become NO. When the accelerator is maintained at substantially the same position over the preceding and current cycles, both of the accelerator position difference indicative data $\Delta L_0$ and $\Delta L_1$ are held equal to zero (0). Therefore, in such case, the answer in the step 155 becomes NO and the answer in the step 157 becomes YES. Furthermore, when the accelerator operating direction is reversed between the preceding and current cycle, i.e. the accelerator is operated in the accelerating direction in the preceding cycle and in the decelerating direction in the current cycle, the currant accelerator position difference indicative data $\Delta L_0$ is a positive value greater then zero (0) and the preceding accelerator position difference indicative data $\Delta L_1$ is a negative value smaller than zero (0). Alternatively, when the accelerator is operated in the decelerating direction in the preceding cycle and in the accelerating direction in the currant cycle, the current accelerator position difference indicative data $\Delta L_0$ is a negative value greater than zero (0) and the preceding accelerator position difference indicative data $\Delta L_1$ is a positive value smaller than zero (0).

In the shown embodiment the succeeding process is varied in dependence on the sensed accelerator operating condition.

Figure 4D:
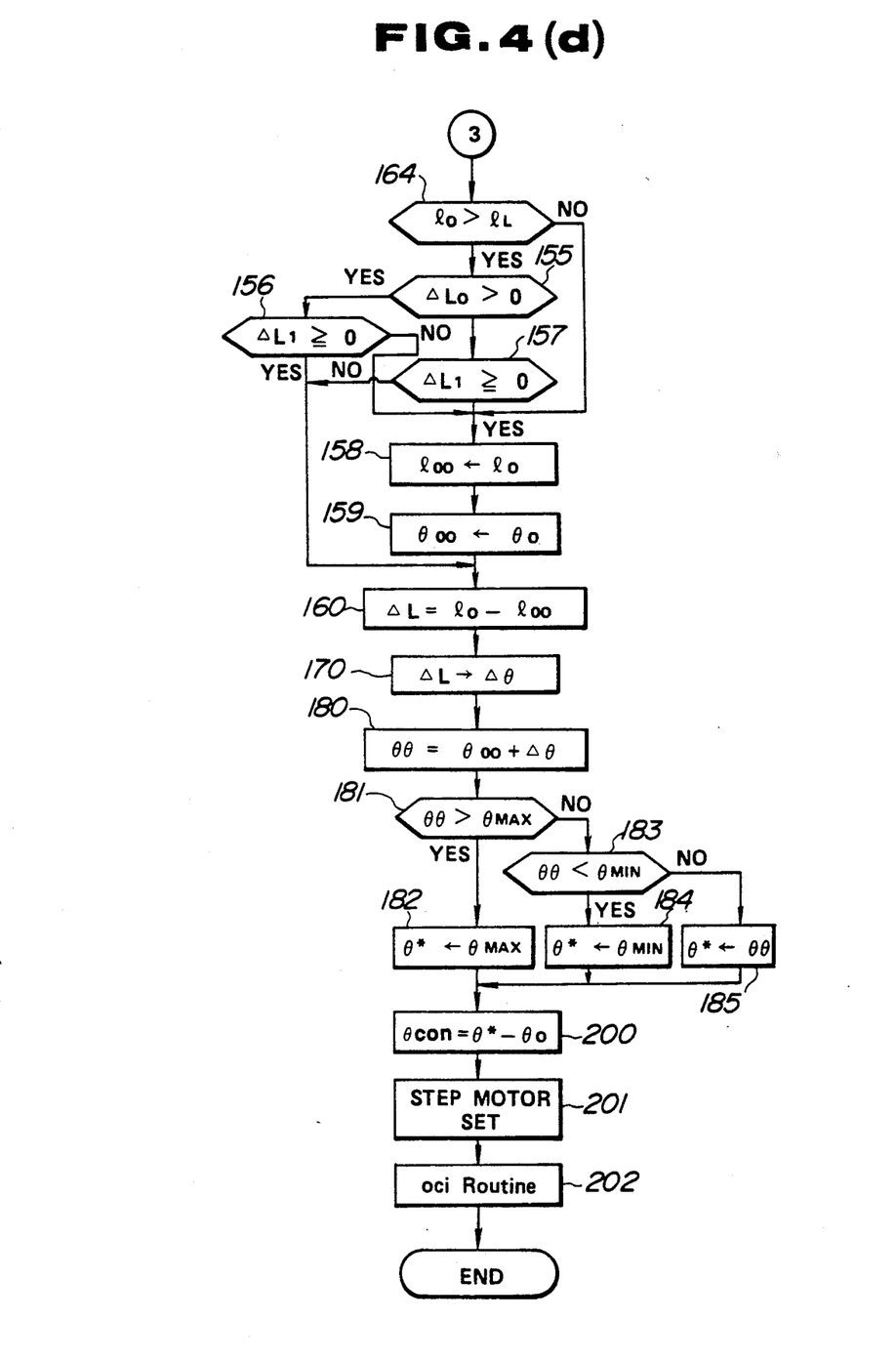

Namely, when the accelerator is continuously operated in the same direction, i.e. accelerating direction or decelerating direction, the process goes to a step 160 which will be discussed later. On the other hand, when the accelerator is held at a constant position or the operating direction is reversed, namely when the preceding accelerator position as checked at the step 156 is smaller than or equal to zero, when the preceding accelerator position difference indicative data wheel is compared with zero (0) as checked at the step 157, or when the instantaneous accelerator operation magnitude indicative value $l_0$ is smaller than or equal to the low accelerator operation magnitude indicative value as checked at the step 164, the instantaneous accelerator operation magnitude indicative data $l_0$ is set as an accelerator reference position indicative value $l_{00}$ at a step 158. Thereafter, the instantaneous throttle valve angular position indicative data $\theta_0$ is set as a throttle valve reference position indicative data $\theta_{00}$, at a step 159.

At the step 160 which is triggered after the process in the step 159, or when the answer at the step 156 is YES or the answer at the step 157 is NO, a relative accelerator operation magnitude $\Delta L$ is derived in relation to the accelerator reference position represented by the accelerator reference position indicative data $l_{00}$. The relative accelerator operation magnitude $\Delta L$ is calculated by subtracting the accelerator reference position indicative data $l_{00}$ from the instantaneous accelerator position indicative data $l_0$. At a step 170, a throttle valve angular displacement magnitude $\Delta\theta$ directed on the basis of the relative accelerator operation magnitude $\Delta L$ derived at the step 160. In practice, derivation of the throttle valve angular displacement magnitude $\Delta\Delta\theta$ is performed utilizing the chart of variation of the throttle valve angular displacement relative to the relative accelerator operation magnitude $\Delta L$ shown in FIG. 4. At a step 180, a target throttle open angle indicative value $\theta\theta$ is derived on the basis of the throttle valve angular displacement magnitude $\Delta\theta$. Practically, derivation of the target throttle open angle indicative value $\theta\theta$ is performed by adding the throttle valve angular displacement magnitude $\Delta\theta$ to the throttle valve reference position indicative data $\theta_{00}$.

The target throttle open angle indicative value $\theta\theta$ is compared with a maximum throttle angle indicative value $\theta_{max}$ which is derived according to the slip control characteristics set at the step 140, at a step 181. When the target throttle open angle indicative value $\theta\theta$ is greater than the maximum throttle open angle indicative value $\theta_{max}$, the target throttle open angle indicative value $\theta\theta$ is modified to the value corresponding to the maximum throttle angle indicative value $\theta_{max}$ to derive a modified target throttle open angle indicative value as a throttle open angle value $\theta^*$. at a step 182. On the other hand, when the target throttle open angle indicative value $\theta\theta$ is smaller than or equal to the maximum throttle angle indicative value $\theta_{max}$, the target throttle open angle indicative value is compared with a minimum throttle open angle indicative value $\theta_{min}$, at a step 183. When the target throttle open angle indicative value $\theta\theta$ is smaller than the minimum throttle open angle indicative value $\theta_{min}$ as checked at the step 183, the target throttle open angle indicative value is modified to the value corresponding to the minimum throttle open angle indicative value to derive the modified target throttle valve open angle indicative value as the throttle open angle value $\theta^*$, at a step 184. On the other hand, when the target throttle valve open angle indicative value $\theta\theta$ is greater than or equal to the minimum throttle valve open angle indicative value $\theta_{min}$ as checked at the step 183, the target throttle valve open angle indicative value as derived at the step 180 is set as the throttle open angle value $\theta^*$, at a step 185.

Figure 5:
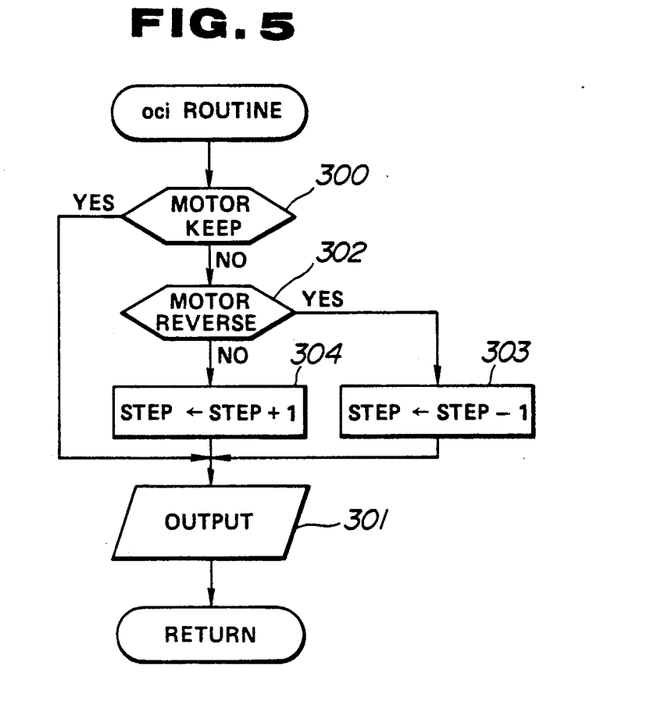
FIG. 5 is a flowchart of sub-routine for controlling the throttle valve angular position.
Figure 6:
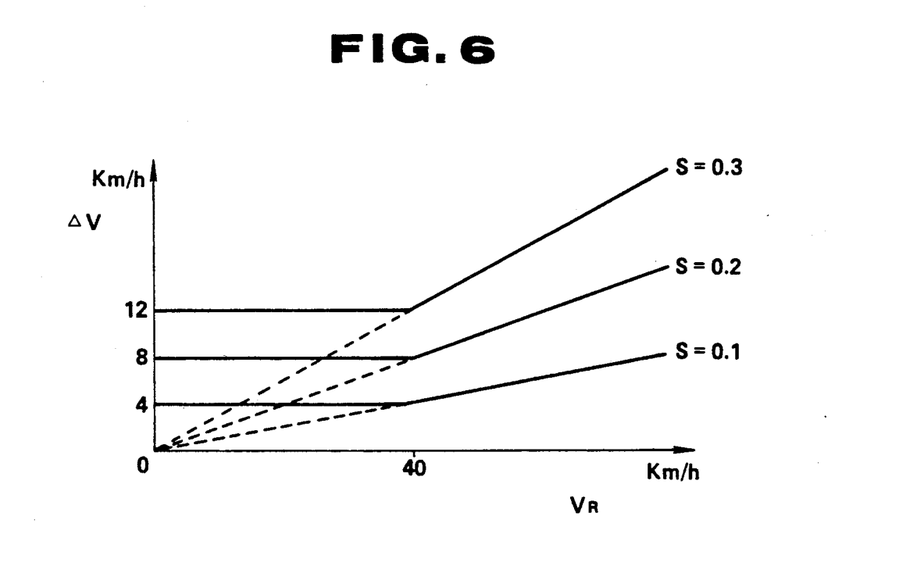
FIG. 6 is a chart showing the variation of slip threshold in relation to rotation speed of driving wheel.

Based on the throttle open angle value $\theta^*$ derived at one of the steps 182, 184 and 185, a throttle valve control value $\theta_{con}$ is derived by subtracting the instantaneous throttle valve open angle indicative value $\theta_0$ from the throttle open angle value $\theta^*$, at a step 200. Based on the throttle valve control value $\theta_{con}$, a control signal, i.e. number of pulses to be supplied to the stepping motor 35 is derived at a step 201. Thereafter, a sub-routine of FIG. 5 is triggered at a step 202.

As set forth, the sub-routine (oci interrupt routine) is triggered at the step 202 to output the throttle control pulse signal for adjusting the throttle valve open angle toward the desired throttle open angle represented by the throttle open angle value $\theta^*$. In the routine of FIG. 5, a check is performed to determine whether the stepping motor 35 is held at the current position for maintaining the throttle valve open angle at the current position, at a step 300. If judgement that the stepping motor 35 is to be maintained is made at the step 300, a throttle control signal to maintain a stator of the stepping motor at the energized state is output at a step 301. On the other hand, a check is performed to determine whether the stepping motor 35 is to be driven in the reversed direction at a step 302. If the stepping motor 35 is to be driven in the reverse direction as checked at the step 302, the number of pulses which represents the steps to be driven in the stepping motor is decremented by one (1) at a step 303. Then, the reduced number of pulses which represents the reduced steps of the stepping motor is output at the step 301. On the other hand, the direction of driving of the stepping motor 35 is the same as the current direction, the number of pulses is incremented by one (1) at a step 304. The increased number of pulses is output at the step 301.

Here, the practical slip control process to be performed by the shown embodiment of the slip control system, according to the present invention, will be discussed hereinbelow with reference to FIGS. 7A and 7B. The shown example is directed to the vehicular driving condition through a stacked and pressured snow and an icy road. On FIGS. 7A and 7B, the vehicle enters into the icy road after traveling on the pressured snowy road. While the vehicle travels on the snowy road, it is assumed that the wheel slippage S is maintained smaller than or equal to 0.1. During vehicular driving, slip control characteristics indicative maps vary gradually from No. 7 map which orders the lowest response characteristics to No. 1 map which orders the second highest response characteristics. The stepwise increasing or rising of the response characteristics is shown in the range of time before a time to in FIGS. 7A and 7B. This is done by repeating the steps 116 to 118 and 161 to 163 in FIG. 4b.

Though this process, the difference of front and rear wheel speeds $V_F$ and $V_R$ increases according to an increasing of wheel slippage. It is assumed that the wheel slippage S reaches the first map down threshold $S_1$ at the time $t_0$. In response to this, an assumption is made that the wheel slippage greater than or equal to the first map down threshold $S_1$ is caused at the throttle open angle at a time 600 msec before the time $t_0$. In the shown example, at the time 600 msec before the time $t_0$, the No. 4 map is selected. Based on this assumption, a map down operation is performed to select the No. 5 map a for preventing wheel slippage in excess of the first map down threshold $S_1$.

This throttle valve open angle reducing technology is advantageously introduced in the preferred process of control for effective recovery of tire traction without causing hunting and without substantial degradation of the engine acceleration characteristics. Namely, when map down operation at the time $t_0$ is performed with respect to the No. 1 map which is selected to the time $t_0$ and to select No. 2 map, reduction of throttle valve angle is apt to be insufficient to maintain unacceptable wheel slippage or to cause excessively great wheel slippage in a short period to cause hunting of control. On the other hand, when map down operation at the time $t_0$ is performed for selecting the No. 7 map, substantial reduction of the throttle valve open angle is caused to serious degradation of the engine acceleration characteristics to degrade drivability of the vehicle.

By selecting the No. 5 map as the slip control characteristics for preventing the excessive wheel slippage, tire traction is resumed. Therefore, the wheel slippage S is reduced to be smaller than $S_1$. Therefore, the map selection is cyclically done to select higher response characteristics defining maps. In the shown embodiment, the map number is reduced from No. 5 to No. 3 until a time $t_1$. Between $t_0$ and $t_1$, the road surface condition changes from a snowy road to an icy road. Because of lower friction on the road surface on the icy road in comparison with that of the snowy road and increasing of the throttle valve open angle, wheel slippage S increases to become greater than or equal to the first map down threshold $S_1$ the time $t_1$. In response to this, a map down operation is performed to lower response characteristics. At this time, since the map selected at a time 600 msec. before the time $t_1$ is No. 1 map which represents higher response characteristics than the current map, i.e. No. 3 map, a map down operation is performed with respect to the current No. 3 map through the steps 260 to 263 of FIG. 4.

Therefore, at the time $t_1$, the No. 4 map, which is the next lower map with respect to the No. 3 map, is selected as shown.

Figure 3:
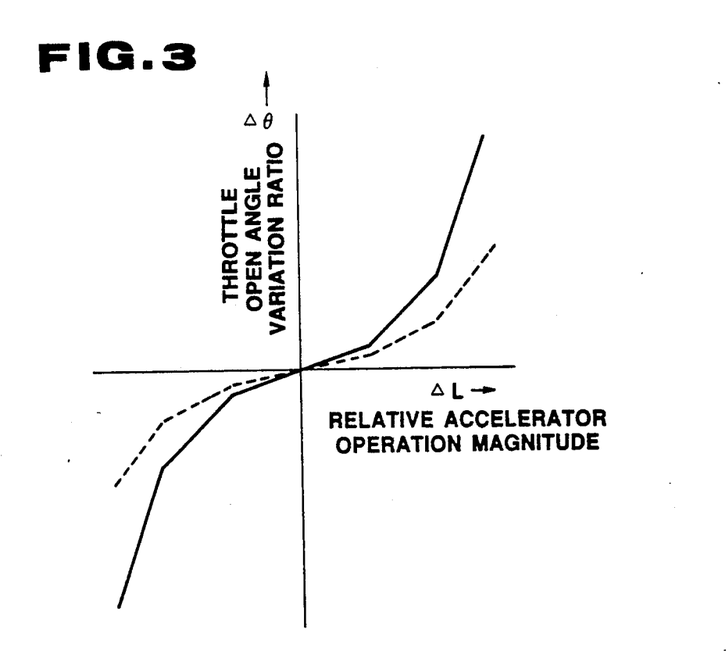
FIG. 3 is a chart showing a throttle valve angular position variation rate in relation to relative variation of the acceleration position.

As will be seen herefrom, each map used in the preferred embodiment of the slip control system defines an accelerator operation range and basically corresponds to the throttle valve angular position with a variable throttle angle variation gradient, substantially linear engine acceleration characteristics relative to the operation magnitude can be obtained to maintain good drive feeling. Furthermore, since the throttle open angle variation relative to the relative variation of the accelerator is set in non-linear characteristics as shown in FIG. 3, enhancement of good acceleration characteristics can be achieved. In addition, since the shown embodiment derives wheel slippage simply based on the difference of front and rear wheel speeds at a low vehicle speed range, response characteristics of the slip control system can be lowered so as not to cause unnecessary slip control in the low vehicle speed range where wheel slippage may not cause serious problem. This can maintain the acceleration characteristics in the low vehicle speed range at a reasonably high level.

In the shown embodiment, a further advantage can be provided by preventing the control from performing a map up operation in the substantially small magnitude of accelerator operation which would otherwise cause a substantial change of driving torque due to map up (selecting higher responsibility map). Furthermore, since the lowest map is used in the substantially small accelerator operation magnitude range, such as at vehicle starting up of running, delicate throttle control can be performed to obtain good vehicle starting up characteristics, especially on a slippery road.

Additionally, since the shown embodiment of the slip control system limits throttle valve variation range with maximum value, unacceptable rapid increasing of the throttle valve open angle which may cause substantial change of engine driving torque can be successfully prevented. Also, in a range where the accelerator operation magnitude is greater than or equal to the upper accelerator operation magnitude threshold, an increase of throttle valve response characteristics is performed when wheel slippage is maintained lower than the wheel slippage threshold $S_0$ for a period longer than a given period $T_0$, and a substantial and rapid increase of wheel slippage can be successfully prevented to provide good vehicle acceleration characteristics fitting with the driver's demand. Furthermore, according to the shown embodiment, once the map down operation is performed, further map down operation will not be performed unless the wheel slippage becomes greater than the second map down threshold which is much greater than the first map down threshold and a map up operation will not be performed unless the map up condition is satisfied. Therefore, hunting in map up and down operation can be successfully prevented.

As can be seen hereabove, the slip control system according to the present invention achieves all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

For example, the maps to be utilized in the slip control system are not limited to the shown ones but can be modified in various fashions. For instance, though the shown embodiment employs maps, each having maximum and minimum values, it is possible to use maps having only maximum values. In addition, though a plurality of maps are used in the shown embodiment, a single map containing throttle open angle variation characteristics in combination of various maps can be employed. Furthermore, it is possible to determine the reduction ratio of the throttle valve response characteristics (increasing of map number in the shown embodiment) depending upon variation rate of the wheel slippage. In addition, though the shown embodiment employs single characteristics for determining the throttle open angle position in relation to the relative accelerator operation magnitude, it is possible to employ a plurality of characteristics as shown by broken lines in FIG. 3. Of course, it is also possible to employ throttle fully close technology in combination with the foregoing variable throttle response characteristics technology. In such case, fully closing control for the throttle valve may be performed when the wheel slippage becomes greater than the second map down threshold after one map down operation is performed in response to the wheel slippage being greater than the first map down threshold.

What is claimed is:

1. A slip control system for an automotive vehicle having at least one driving wheel connected to an automobile engine via a power train to be driven by the engine driving torque, said automotive engine having an engine speed control means driven by a manually operable accelerator to a desired position for obtaining a desired engine speed, comprising:
    an accelerator servo system for driving said engine speed control means in response to an engine speed control command;
    wheel slippage monitoring means for monitoring wheel slippage on said driving wheel on the basis of a monitored vehicle speed and a monitored speed at said driving wheel;

memory means for storing a plurality of preset mutually distinct engine speed control characteristics, each defining response characteristics of said engine speed control means relative to operation magnitudes of said accelerator;

controller means for deriving said engine speed control command based upon the operation magnitude of said accelerator and according to one of said stored control characteristics, said controller means selecting one of said stored control characteristics to increase the response characteristics for a higher response of said engine speed control means relative to the operation magnitude of said accelerator as long as said wheel slippage monitored by said wheel slippage monitoring means is maintained lower than a first wheel slippage threshold, and to lower the response characteristics for lower response of said engine speed control means relative to the operation magnitude of said accelerator in response to said wheel slippage monitoring means detecting the wheel slippage as being greater than said first wheel slippage threshold;

wherein said controller means is responsive to said wheel slippage monitoring means detecting the wheel slippage greater than said first wheel slippage threshold to compare values representing one of the stored control characteristics that was actually used at the given time period before the occurrence of a wheel slippage greater than the first wheel slippage threshold and one of the stored control characteristics that is currently used, respectively, so as to identify a lower control characteristic between said compared control characteristics that defines lower response characteristics of said engine speed control means, for performing a lowering of the response characteristics by selecting a further lower control characteristic that defines further lower response characteristics with respect to said identified lower control characteristic.

2. A slip control system as set forth in claim 1, wherein said lowering of the response characteristics is performed such that said selected further lower control characteristic defines the next lower response characteristics with respect to said identified lower control characteristic.

3. A slip control system as set forth in claim 2, wherein said controller means disables the lowering of the response characteristics during a period in which the wheel slippage is continuously greater than said first wheel slippage threshold after once lowering the response characteristics and wherein said controller means is responsive to said wheel slippage subsequently increasing to exceed a second wheel slippage threshold that is set at a greater value than said first wheel slippage threshold to further lower the response characteristics by selecting a corresponding further lower control characteristic.

4. A slip control system for an automotive vehicle having at least one driving wheel connected to an automotive engine via a power train to be driven by the engine driving torque, said automotive engine having an engine speed control means driven by a manually operable accelerator to a desired position for obtaining a desired engine speed, comprising:

an accelerator servo system for driving said engine speed control means in response to an engine speed control command;

wheel slippage monitoring means for monitoring wheel slippage on said driving wheel on the basis of a monitored vehicle speed and a monitored speed at said driving wheel;

memory means for storing a plurality of preset mutually distinct engine speed control characteristics, each defining response characteristics of said engine speed control means relative to operation magnitudes of said accelerator;

controller means for deriving said engine speed control command based upon the operation magnitude of said accelerator and according to one of said stored control characteristics, said controller means selecting one of said stored control characteristics to increase the response characteristics for a higher response of said engine speed control means relative to the operation magnitude of said accelerator as long as said wheel slippage monitored by said wheel slippage monitoring means is maintained lower than a first wheel slippage threshold, and to lower the response characteristics for lower response of said engine speed control means relative to the operation magnitude of said accelerator in response to said wheel slippage monitoring means detecting the wheel slippage as being greater than said first wheel slippage threshold; and wherein each of said stored plurality of control characteristics includes a maximum allowable engine speed control command value for a given frictional coefficient.

5. A slip control system as set forth in claim 4, wherein said stored plurality of control characteristics include the highest control characteristics defining the highest response characteristics of said engine speed control means and having the greatest maximum allowable engine speed control command value, and the lowest response characteristics defining the lowest response characteristics of said engine speed control means and having the smallest maximum allowable engine speed control command value.

6. A slip control system as set forth in claim 4, wherein each of said stored plural control characteristics further defines a minimum engine speed control command value, and wherein each said engine speed control command value is derived at a value between said minimum and maximum values of the selected control characteristic.

7. A slip control system as set forth in claim 6, wherein each said engine speed control command value is derived based on the magnitude of the manual operation of the accelerator, the selected control characteristic, and a variation magnitude of the accelerator operation.

8. A slip control system as set forth in claim 7, wherein said memory means includes a further engine speed control characteristic that defines variation characteristics of said engine speed control means in terms of said variation magnitude of the accelerator operation, and wherein said controller means derives a required variation magnitude of said engine speed control means based on said variation magnitude of the accelerator operation using said further engine speed control characteristic, said derived variation magnitude of said engine speed control means being added to a reference magnitude of said engine speed control means so as to derive said engine speed control command value, said engine speed control command value having upper and lower limits respectively defined by said maximum and minimum values of the selected control characteristic.

9. A slip control system as set forth in claim 8, wherein said reference magnitude of the engine speed control means is updated by an instantaneous magnitude of the engine speed control means at an engine operating condition determined by monitoring the variation magnitude of the accelerator operation.

10. A slip control system for an automotive vehicle having at least one driving wheel connected to an automotive engine via a power train to be driven by the engine driving torque, said automotive engine having an engine speed control means driven by a manually operable accelerator to a desired position for obtaining a desired engine speed, comprising:
an accelerator servo system for driving said engine speed control means in response to an engine speed control command;
wheel slippage monitoring means for monitoring wheel slippage on said driving wheel on the basis of a monitored vehicle speed and a monitored speed at said driving wheel;
memory means for storing a plurality of preset mutually distinct engine speed control characteristics, each defining response characteristics of said engine speed control means relative to operation magnitudes of said accelerator;
controller means for deriving said engine speed control command based upon the operation magnitude of said accelerator and according to one of said stored control characteristics, said controller means selecting one of said stored control characteristics to increase the response characteristics for a higher response of said engine speed control means relative to the operation magnitude of said accelerator as long as said wheel slippage monitored by said wheel slippage monitoring means is maintained lower than a first wheel slippage threshold, and to lower the response characteristics for lower response of said engine speed control means relative to the operation magnitude of said accelerator in response to said wheel slippage monitoring means detecting the wheel slippage as being greater than said first wheel slippage threshold and;
wherein said controller means is responsive to said wheel slippage monitoring means detecting a wheel slippage smaller than a third wheel slippage threshold for selecting higher control characteristics.

11. A slip control system as set forth in claim 10, wherein said controller means selects higher control characteristics when said wheel slippage monitoring means continuously detects said wheel slippage as being smaller than said third wheel slippage threshold for a given period of time.

12. A slip control system as set forth in claim 11, wherein said controller means cyclically selects higher control characteristics as long as said wheel slippage is maintained smaller than said third wheel slippage threshold.

13. A slip control system as set forth in claim 12, wherein said third wheel slippage threshold is set at an equal value to said first wheel slippage threshold.

14. A slip control system for an automotive vehicle having at least one driving wheel connected to an automotive engine via a power train to be driven by the engine driving torque, said automotive engine having a throttle valve driven by a manually operable accelerator to a desired position for obtaining a desired throttle value open angle, comprising:
an accelerator servo system for driving said throttle valve in response to a throttle valve open angle control command;
wheel slippage monitoring means for monitoring wheel slippage on said driving wheel on the basis of a monitored vehicle speed and a monitored speed at said driving wheel;
memory means for storing a plurality of preset mutually distinct engine speed control characteristics, each defining response characteristics of said engine speed control means relative to operation magnitudes of said accelerator;
controller means for deriving said throttle valve open angle control command based upon the operation magnitude of said accelerator and according to one of said stored control characteristics, said controller means selecting one of said stored control characteristics to increase the response characteristics for a higher response of said throttle valve relative to the operation magnitude of said accelerator as long as said wheel slippage monitored by said wheel slippage monitoring means is maintained lower than a first wheel slippage threshold, and to lower the response characteristics for lower response of said throttle valve relative to the operation magnitude of said accelerator in response to said wheel slippage monitoring means detecting the wheel slippage as being greater than said first wheel slippage threshold;
wherein said controller means is responsive to said wheel slippage monitoring means detecting the wheel slippage greater than said first wheel slippage threshold to select a lower control characteristic that defines lower response characteristics of said throttle valve open angle control means with reference to one of the stored control characteristics that was actually used at a given time period before a time at which the wheel slippage greater than said first wheel slippage threshold is detected and;
wherein said controller means is responsive to said wheel slippage monitoring means detecting the wheel slippage greater than said first wheel slippage threshold to compare values representing one of the stored control characteristics that was actually used at the given time period before the occurrence of a wheel slippage greater than the first wheel slippage threshold and one of the stored control characteristics that is currently used, respectively, so as to identify a lower control characteristic between said compared control characteristics that defines lower response characteristics of said throttle valve open angle control means, for performing a lowering of the response characteristics by selecting a further lower control characteristics that defines further lower response characteristics with respect to said identified lower control characteristic.

15. A slip control system as set forth in claim 14, wherein said lowering of the response characteristics is performed such that said selected further lower control characteristic defines the next lower response characteristics with respect to said identified lower control characteristic.

16. A slip control system as set forth in claim 15, wherein said controller means disables the lower of the response characteristics during a period in which the wheel slippage is greater than said first wheel slippage threshold after once lowering the response characteristics, and wherein said controller means is responsive to said wheel slippage subsequently increasing to exceed a second wheel slippage threshold that is set at a greater value than said first wheel slippage threshold to further lower the response characteristics by selecting a corresponding further lower control characteristic.

17. A slip control system for an automotive vehicle having at least one driving wheel connected to an automotive engine via a power train to be driven by the engine driving torque, said automotive engine having a throttle valve driven by a manually operable accelerator to a desired position for obtaining a desired throttle valve open angle, comprising:
an accelerator servo system for driving said throttle valve in response to a throttle valve open angle control command;
wheel slippage monitoring means for monitoring wheel slippage on said driving wheel on the basis of a monitored vehicle speed and a monitored speed at said driving wheel;
memory means for storing a plurality of preset mutually distinct engine speed control characteristics, each defining response characteristics of said engine speed control means relative to operation magnitudes of said accelerator;
controller means for deriving said throttle valve open angle control command based upon the operation magnitude of said accelerator and according to one of said stored control characteristics, said controller means selecting one of said stored control characteristics to increase the response characteristics for a higher response of said throttle valve relative to the operation magnitude of said accelerator as long as said wheel slippage monitored by said wheel slippage monitoring means is maintained lower than a first wheel slippage threshold, and to lower the response characteristics for lower response of said throttle valve relative to the operation magnitude of said accelerator in response to said wheel slippage monitoring means detecting the wheel slippage as being greater than said first wheel slippage threshold and;
wherein each of said stored plural control characteristics includes a maximum allowable throttle valve open angle control command value for a given frictional coefficient.

18. A slip control system as set forth in claim 17, wherein said stored plural control characteristics includes the highest control characteristics defining the highest response characteristics of said throttle valve and having the greatest maximum throttle valve open angle control command value and the lowest response characteristics defining the lowest response characteristics of said throttle valve and having the smallest maximum throttle valve open angle control command value.

19. A slip control system as set forth in claim 17, wherein said controller means selects higher control characteristics when said wheel slippage monitoring means continuously detects said wheel slippage as being smaller than said third wheel slippage threshold for a given period of time.

20. A slip control system as set forth in claim 19, wherein said controller means cyclically selects higher control characteristics as long as said wheel slippage is maintained smaller than said third wheel slippage threshold.

21. A slip control system as set forth in claim 20, wherein said third wheel slippage threshold is set at an equal value to said first wheel slippage threshold.

22. A slip control system for an automotive vehicle having at least one driving wheel connected to an automotive engine via a power train to be driven by the engine driving torque, said automotive engine having a throttle valve driven by a manually operable accelerator to a desired position for obtaining a desired throttle valve open angle, comprising:
an accelerator servo system for driving said throttle valve in response to a throttle valve open angle control command;
wheel slippage monitoring means for monitoring wheel slippage on said driving wheel on the basis of a monitored vehicle speed and a monitored speed at said driving wheel;
memory means for storing a plurality of preset mutually distinct engine speed control characteristics, each defining response characteristics of said engine speed control means relative to operation magnitudes of said accelerator;
controller means for deriving said throttle valve open angle control command based upon the operation magnitude of said accelerator and according to one of said stored control characteristics, said controller means selecting one of said stored control characteristics to increase the response characteristics for a higher response of said throttle valve relative to the operation magnitude of said accelerator as long as said wheel slippage monitored by said wheel slippage monitoring means is maintained lower than a first wheel slippage threshold, and to lower the response characteristics for lower response of said throttle valve relative to the operation magnitude of said accelerator in response to said wheel slippage monitoring means detecting the wheel slippage as being greater than said first wheel slippage threshold and;
wherein said controller means is responsive to said wheel slippage monitoring means detecting wheel slippage smaller than a third wheel slippage threshold for selecting higher control characteristics.

* * * * *